United States Patent [19]

Yokoyama

[11] Patent Number: 5,572,971
[45] Date of Patent: Nov. 12, 1996

[54] EXHAUST BRAKE SYSTEM FOR A MOTOR VEHICLE

[75] Inventor: Fumiyoshi Yokoyama, Shioya-gun, Japan

[73] Assignee: Mitsubishi Jidosha Kogyo Kabushiki Kaisha, Tokyo, Japan

[21] Appl. No.: 534,716

[22] Filed: Sep. 27, 1995

[30] Foreign Application Priority Data

Sep. 30, 1994 [JP] Japan .................... 6-261093

[51] Int. Cl.⁶ .............. F02D 9/04; F02D 41/40
[52] U.S. Cl. ......................... 123/323; 123/357
[58] Field of Search ..................... 123/320, 323, 123/478, 357

[56] References Cited

U.S. PATENT DOCUMENTS

| 4,205,639 | 6/1980 | Kawase et al. ............ 123/323 |
| 5,193,657 | 3/1993 | Iizuka ...................... 123/323 |

FOREIGN PATENT DOCUMENTS

| 53654 | 3/1983 | Japan ................. 123/323 |
| 277827 | 11/1988 | Japan ................. 123/323 |
| 233836 | 9/1990 | Japan ................. 123/323 |
| 5149176 | 6/1993 | Japan . |
| 222959 | 8/1993 | Japan ................. 123/323 |
| 195827 | 8/1993 | Japan ................. 123/323 |
| 6101527 | 4/1994 | Japan . |
| 6193489 | 7/1994 | Japan . |
| 6213014 | 8/1994 | Japan . |
| 6213015 | 8/1994 | Japan . |

*Primary Examiner*—Willis R. Wolfe
*Attorney, Agent, or Firm*—Birch, Stewart, Kolasch & Birch, LLP

[57] ABSTRACT

An exhaust brake system for a motor vehicle comprises an exhaust brake valve inserted in the exhaust passage of an engine, and a control unit for correcting a depression stroke of the accelerator pedal for a predetermined period from the point of time at which the exhaust brake valve is switched from the closed position toward the open position as a result of the depression of the accelerator pedal, wherein the control unit controls a fuel injection pump in such a manner that the amount of fuel supplied to the combustion chamber of the engine is reduced to a value smaller than the amount of fuel injection determined by the actual depression stroke of the accelerator pedal.

12 Claims, 2 Drawing Sheets

EXHAUST BRAKE SYSTEM FOR A MOTOR VEHICLE

BACKGROUND OF THE INVENTION

1. Field of the Invention

This invention relates to an exhaust brake system installed in a large-size vehicle such as a truck or a bus.

2. Description of the Related Art

A large-size vehicle is equipped with an exhaust brake system which operates in combination with a diesel engine and which has an exhaust brake valve for opening and closing the exhaust passage of the engine.

When the exhaust brake valve is closed, the discharge of gas from the combustion chamber of the engine is restricted, and therefore, the pressure in the combustion chamber rises during the exhaust stroke of the engine. The increased pressure exerts a force upon the piston in a direction to impede the upward motion thereof, that is, to push back the piston, during the exhaust stroke, with the result that the engine itself functions as brake. During operation of the exhaust brake system, injection of fuel into the combustion chamber is automatically suspended.

When the exhaust brake system is rendered inoperative by depression of the accelerator pedal, the exhaust brake valve is opened and at the same time the injection of fuel into the combustion chamber is restarted. Accordingly, the combustion and exhaust strokes of the engine are performed normally, whereby the engine output increases, permitting acceleration of the vehicle.

The exhaust brake system described above is useful in assisting the foot brake of the vehicle, but in some cases, black smoke is temporarily produced and contained in the exhaust gas from the engine immediately after the exhaust brake system is rendered inoperative.

To reduce the generation of such black smoke, Unexamined Japanese Patent Publication No. 3-246343, for example, discloses an exhaust brake system in which the suspension of fuel injection into the combustion chamber is continued until a predetermined time period elapses after depression of the accelerator pedal.

However, if the fuel injection is suspended even though the accelerator pedal is depressed, the engine output cannot be increased, which deteriorates the response to vehicle acceleration, that is, the drivability of the vehicle.

SUMMARY OF THE INVENTION

It is an object of this invention to provide an exhaust brake system for a motor vehicle wherein black smoke produced and contained in exhaust gas from a diesel engine can be reduced without deteriorating the drivability of the vehicle when the exhaust brake system is rendered inoperative.

The above object is achieved by an exhaust brake system for a motor vehicle according to this invention, which comprises a valve inserted in an exhaust passage extending from a diesel engine of the motor vehicle, the valve having an open position at which the exhaust passage is opened, and a closed position at which the exhaust passage is closed; actuating means for actuating the valve so as to switch between the open position and the closed position; switch means for operating the actuating means to cause the valve to switch from the open position toward the closed position; releasing means for operating the actuating means to cause the valve to switch from the closed position toward the open position when an accelerator pedal of the motor vehicle is depressed while the valve is in the closed position; and control means for reducing an amount of fuel to be supplied per injection to a combustion chamber of the engine to a value smaller than a required amount of fuel per injection determined based on depression of the accelerator pedal, during a predetermined control period from a release time at which the actuating means is operated by the releasing means.

In the above exhaust brake system, when the valve is switched from the closed position toward the open position as a result of depression of the accelerator pedal, that is, when the valve is not yet fully opened, the amount of fuel supplied per injection to the combustion chamber is reduced to a value smaller than the required amount of fuel injection from the release time for the control period. Therefore, even if the intake of air to the combustion chamber is insufficient during the control period, fuel injected into the combustion chamber burns satisfactorily. Consequently, the amount of generation of black smoke in the exhaust gas can be reduced.

Since fuel is injected into the combustion chamber also during the control period, the engine output increases to a certain extent. Accordingly, when the amount of fuel supplied per injection to the combustion chamber is thereafter set to an injection amount determined based on the depression of the accelerator pedal upon lapse of the control period, the output of the engine can be quickly increased and the response to vehicle acceleration is not deteriorated.

Specifically, during the control period, the control means controls the amount of fuel per injection in accordance with a predetermined control pattern. The control pattern has a first section which is started from the release time and in which the amount of fuel per injection is reduced to a value smaller than the required amount of fuel injection, a second section which is started upon lapse of the first section and in which the amount of fuel per injection is rapidly increased to a value close to the required amount of fuel injection, and a third section which is started upon lapse of the second section and in which the amount of fuel per injection is made to converge to the required amount of fuel injection.

Preferably, the total amount of fuel supplied to the combustion chamber during the first section of the control pattern is restricted to 5% to 30% of an amount of fuel supply determined by the required amount of fuel per injection and a period equivalent to the first section. In this case, during the first section of the control pattern, generation of black smoke in the exhaust gas is prevented and also the engine output can be reliably increased.

Preferably, the amount of fuel per injection is gradually increased during the first section of the control pattern. In this case, as the opening of the aforementioned valve increases during the first section of the control pattern, that is, as the amount of intake air increases during the first section, the amount of fuel per injection also is gradually increased, whereby incomplete combustion of fuel can be effectively prevented. During the subsequent second section of the control pattern, the amount of fuel per injection is rapidly increased toward the required amount of fuel injection, and therefore, the engine output can be smoothly and quickly increased.

In the case where the aforementioned valve is a butterfly valve actuated by a pneumatic actuator, for example, an air cylinder, the period of the first section of the control pattern is set to 0.07 to 0.18 sec.

The control pattern of the control means is implemented by a correction pattern for correcting an actual accelerator signal corresponding to depression of the accelerator pedal.

The exhaust brake system may further comprise a second valve inserted in an intake passage of the engine and having an open position at which the intake passage is opened and a closed position at which the intake passage is closed, and in this case, the second valve is opened or closed together with the first-mentioned valve.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
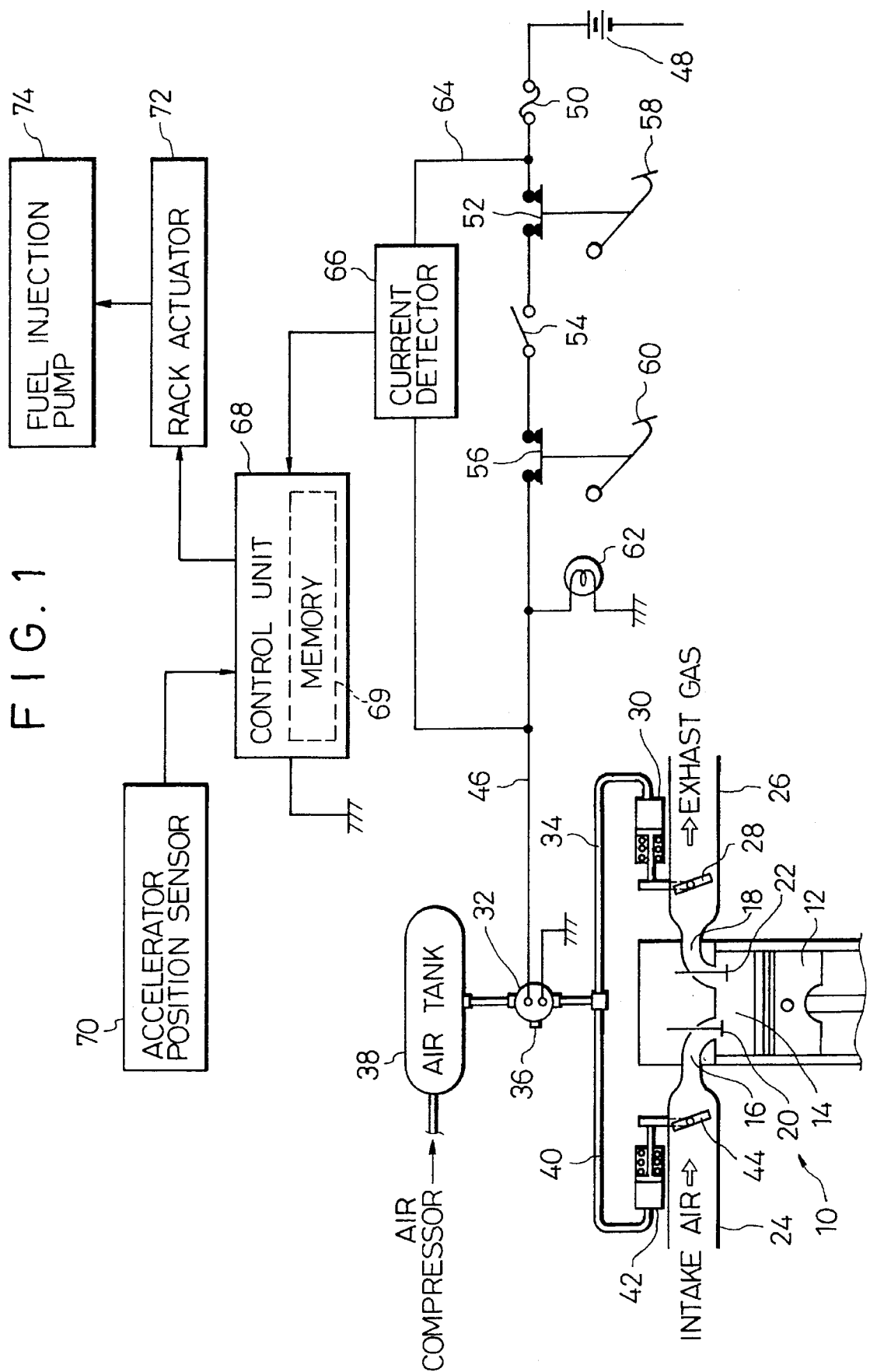
FIG. 1 is a schematic diagram illustrating an exhaust brake system according to one embodiment of this invention.

A four-cycle diesel engine 10 shown in FIG. 1 is installed in a large-size vehicle such as a truck or a bus. The diesel engine 10 has a piston 12 received in a cylinder bore, thus defining a combustion chamber 14 in the cylinder bore. The combustion chamber 14 is connected to an intake port 16 and an exhaust port 18. The intake port 16 is opened and closed by an intake valve 20, and the exhaust port 18 is opened and closed by an exhaust valve 22. An intake passage 24 extends from the intake port 16, and an exhaust passage 26 extends from the exhaust port 18.

The engine 10 is equipped with an exhaust brake system including a butterfly-type exhaust brake valve 28. The exhaust brake valve 28 is arranged in the exhaust passage 26 and is normally opened. The exhaust brake valve 28 is operated by a pneumatic actuator, or more specifically, by an air cylinder 30. The air cylinder 30 has a pressure chamber connected to a solenoid-operated three-way valve 32 via an air pressure passage 34. More specifically, the three-way valve 32 is a three-port, two-position directional control valve having an input port, an output port, and an atmosphere port 36. The air pressure passage 34 is connected to the output port of the valve 32. The input port of the three-way valve 32 is connected to an air tank 38 through a supply passage, and the atmosphere port 36 of the valve 32 is open to the atmosphere. The air tank 38 is supplied with compressed air from an air compressor, and the internal pressure thereof is maintained at a fixed pressure at all times.

When the three-way valve 32 is in a neutral position, the input port is connected to neither the output port nor the atmosphere port, while the output port and the atmosphere port 36 are connected to each other. When the three-way valve 32 is switched from the neutral position roan operative position, the input port is connected to the output port while the connection between the output port and the atmosphere port 36 is cut off.

Another air pressure passage 40 diverges from the air pressure passage 34, and is connected to the pressure chamber of a pneumatic actuator, that is, an air cylinder 42. The air cylinder 42 is capable of actuating a butterfly-type silencer valve 44. The silencer valve 44 is arranged in the intake passage 24 and is normally opened.

The solenoid of the three-way valve 32 has two terminals, one of which is grounded while the other of which is electrically connected to a feeder line 46. The feeder line 46 is grounded via a battery 48. In the feeder line 46 are inserted a fuse 50, a clutch switch 52, an exhaust brake switch 54, and an accelerator switch 56 in this order from the side of the battery 48. The clutch switch 52 is a normally-closed switch and opens when a clutch pedal 58 of the vehicle is depressed. The accelerator switch 56 also is a normally-closed switch and opens when an accelerator pedal 60 of the vehicle is depressed.

The exhaust brake switch 54, on the other hand, is a normally-open switch and is arranged in the vicinity of the steering wheel of the vehicle. The exhaust brake switch 54 also serves as an operation switch for the retarder of the engine 10, that is, the engine brake.

Further, an indicator lamp 62 is electrically connected to the feeder line 46 in parallel with the battery 48.

A branch line 64 extends from the feeder line 46 at a location between the fuse 50 and the clutch switch 52 and is connected to the same feeder line 46 at a location between the three-way valve 32 and the accelerator switch 56. A current detector 66 is inserted in the branch line 64, supplies an ON signal to a control unit 68 when a current is supplied to the three-way valve 32 through the feeder line 46, and supplies an OFF signal to the control unit 68 when no current is supplied to the three-way valve 32.

The control unit 68 includes an I/O interface, a microprocessor, and a memory 69 such as a RAM and a ROM, and the current detector 66 is electrically connected to an input terminal of the control unit 68.

An accelerator position sensor 70 is electrically connected to another input terminal of the control unit 68. The accelerator position sensor 70 detects a depression stroke of the accelerator pedal 60 and supplies the control unit 68 with an accelerator signal corresponding to the depression stroke.

A rack actuator 72 is electrically connected to an output terminal of the control unit 68, and is also mechanically connected to a control rack (not shown) of an in-line fuel injection pump 74. When a rack position signal is output from the control unit 68 to the rack actuator 72, the rack actuator 72 actuates the control rack in accordance with the rack position signal, to thereby control the amount of fuel delivered from the fuel injection pump 74 to a fuel injection nozzle, not shown, that is, the amount of fuel injection from the fuel injection nozzle. The fuel injection nozzle is arranged so as to face the combustion chamber 14 of the engine 10.

More specifically, the rack position signal output from the control unit 68 is determined based on the rotational speed of the engine 10, the accelerator signal from the accelerator position sensor 70, the water temperature of the engine 10, the intake boost pressure, the vehicle speed, etc. Accordingly, the control unit 68 and the rack actuator 72 constitute, together with various sensors including the accelerator position sensor 70, an electronic governor system for the fuel injection pump 74.

The control unit 68 also has the function of correcting the accelerator signal from the accelerator position sensor 70. Before explaining this function, the basic operation of the exhaust brake system will be described.

If the driver turns on the exhaust brake switch 54 while the vehicle travels on a long downhill road, for example, the three-way valve 32 is supplied with current via the feeder line 46 and thus is shifted from the neutral position to the operative position, whereby the connection between the air tank 38 and the air pressure passage 34 is established. Accordingly, the air pressure in the air tank 38 is supplied via the three-way valve 32 and the air pressure passage 34 to the air cylinder 30, which then closes the exhaust brake valve 28, and the exhaust brake system is actuated at this point of time. The air pressure in the air pressure passage 34 is also supplied via the air pressure passage 40 to the air cylinder 42, which then closes the silencer valve 44.

When the exhaust brake valve 28 is closed, gas cannot be discharged from the combustion chamber 14 during the exhaust stroke of the engine 10; therefore, the pressure in the combustion chamber 14 rises. The increased pressure exerts a force on the piston 12 in a direction to impede the upward motion thereof, with the result that the vehicle is applied with a braking force, that is, the exhaust brake is rendered operative.

During operation of the exhaust brake valve 28, the silencer valve 44 also is closed, and therefore, no intake air is supplied to the combustion chamber 14 of the engine 10. Consequently, noise produced when intake air is introduced into the combustion chamber 14 can be reduced.

When the three-way valve 32 is supplied with current, moreover, the current detector 66 outputs an ON signal. Upon receiving the ON signal, the control unit 68 outputs a fuel-cut signal to the rack actuator 72, which then suspends the delivery of fuel from the fuel injection pump 74 via the control rack. Consequently, fuel is not injected into the combustion chamber 14 of the engine 10 while the exhaust brake is in operation.

When the exhaust brake switch 54 is turned on, the accelerator pedal 60 is usually not depressed; therefore, no accelerator signal is supplied from the accelerator position sensor 70 to the control unit 68.

If, during operation of the exhaust brake valve 28, the driver depresses the accelerator pedal 60 or the clutch pedal 58 and thus the corresponding switch 56 or 52 is opened, the supply of current to the three-way valve 32 is stopped at this point of time, and the three-way valve 32 shifts from the operative position to the neutral position. In this case, since the air pressure passage 34 is connected to the atmosphere port 36 of the three-way valve 32, the air pressure till then supplied to the air cylinders 30 and 42 is discharged from the atmosphere port 36 of the three-way valve 32. Accordingly, the air cylinders 30 and 42 open the exhaust brake valve 28 and the silencer valve 44, respectively, and these valves 28 and 44 are rendered inoperative at this point of time.

In the case where the exhaust brake valve 28 and the silencer valve 44 are rendered inoperative as a result of depression of the accelerator pedal 60, the accelerator position sensor 70 supplies the control unit 68 with an accelerator signal corresponding to the degree of depression of the accelerator pedal 60.

On receiving the accelerator signal, the control unit 68 stops outputting the fuel-cut signal, and supplies the rack actuator 72 with a rack position signal corresponding to the accelerator signal. In accordance with the rack position signal, the rack actuator 72 actuates the control rack of the fuel injection pump 74, whereby fuel is delivered from the fuel injection pump 74 to the fuel injection nozzle. Consequently, injection of fuel into the combustion chamber 14 of the engine 10 is restarted.

When the fuel injection into the combustion chamber 14 is restarted, that is, when the exhaust brake valve 28 is switched from the closed position to the open position, the control unit 68 corrects an actual accelerator signal supplied from the accelerator position sensor 70.

Figure 2:
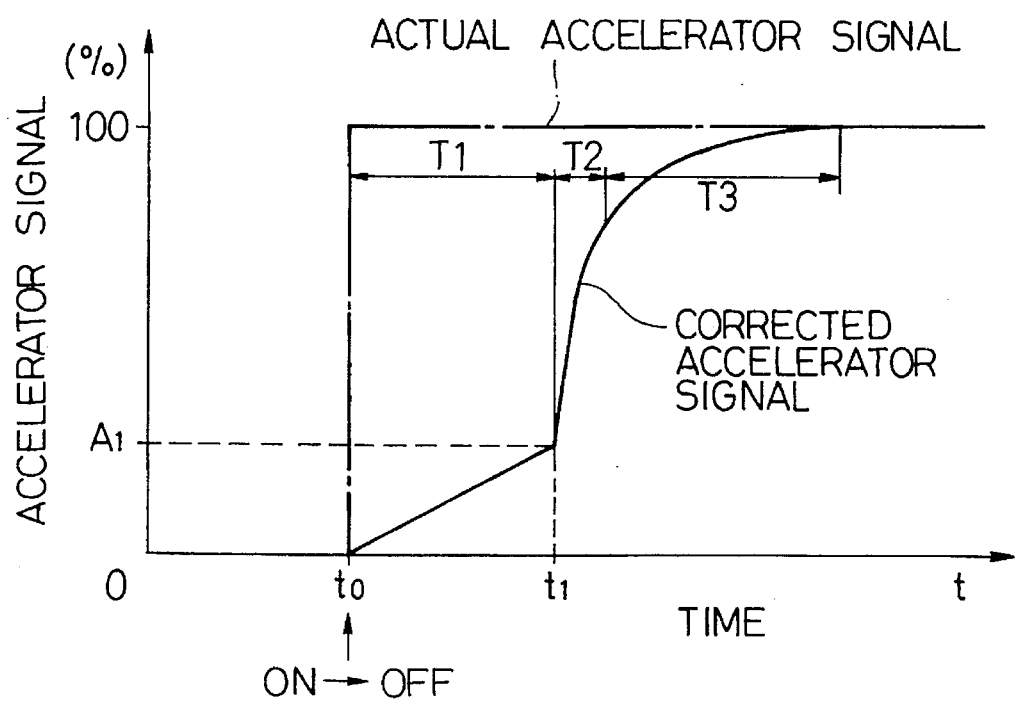
FIG. 2 is a graph illustrating a correction pattern for an actual accelerator signal from an accelerator position sensor.

More specifically, the control unit 68 corrects the actual accelerator signal in accordance with a map shown in FIG. 2. Provided the exhaust brake valve 28 starts switching from the closed position to the open position at time $t_0$, as shown in FIG. 2, the actual accelerator signal from the accelerator position sensor 70 rises at this start time $t_0$, as indicated by the one-dot-chain line, and the level of the actual accelerator signal is determined by the depression stroke of the accelerator pedal 60.

By contrast, the accelerator signal corrected by the control unit 68 gradually rises from the start time $t_0$ at a fixed increase rate, as indicated by the solid line in FIG. 2, and reaches value $A_1$ upon lapse of period T1, that is, at time $t_1$. The period T1, the increase rate, and the value $A_1$ are obtained based on the results of vehicle running tests. For example, the period T1 is set to 0.07 to 0.18 sec, for example, and the increase rate and $A_1$ are set to values such that the amount of fuel injected into the combustion chamber 14 in accordance with the corrected accelerator signal during the period T1 falls within a range of 5% to 30% of the amount of fuel that is injected into the combustion chamber 14 in accordance with the actual accelerator signal during the same period T1.

During a period T2 following the period T1, the corrected accelerator signal is sharply increased from $A_1$ toward the actual accelerator signal, and during a subsequent period T3, the corrected accelerator signal is gradually increased toward the actual accelerator signal so as to finally converge to the same.

When the supply of current to the three-way valve 32 is stopped, the signal supplied from the current detector 66 to the control unit 68 switches from ON to OFF level; from this ON-to-OFF switching the control unit 68 can detect the aforementioned start time $t_0$. The map shown in FIG. 2 is stored in advance in the memory of the control unit 68.

The actual accelerator signal is modified to the corrected accelerator signal within the control unit 68 when the fuel injection into the combustion chamber 14 is restarted, as mentioned above, and in this case, the corrected accelerator signal is gradually increased from the start time $t_0$ for the period T1 at the predetermined increase rate toward $A_1$.

Therefore, the control unit 68 generates the rack position signal based on the corrected accelerator signal, not the actual accelerator signal, and supplies the thus-generated rack position signal to the rack actuator 72. Accordingly, immediately after the start time $t_0$, the amount of fuel supplied per injection to the combustion chamber 14 is almost zero, and is thereafter gradually increased during the period T1.

In the case where the amount of fuel injection into the combustion chamber 14 is restricted in this manner from the start time $t_0$ for the period T1, no black smoke is produced and contained in the exhaust gas discharged from the exhaust passage 26 of the engine 10 and the discharge quantity of black smoke from the engine 10 can be greatly reduced.

The discharge quantity of black smoke is presumably reduced for the following reason:

When the current supply to the three-way valve 32 is stopped, the exhaust brake valve 28 and the silencer valve 44 are not immediately switched from their closed position to open position. Namely, there is a slight time lag before the exhaust brake valve 28 and the silencer valve 44 are completely opened, and while the valves 28 and 44 are in the process of switching from their closed position to open position, the supply of intake air to and the discharge of gas from the combustion chamber 14 are both insufficient. Therefore, if the amount of fuel determined per injection based on the actual accelerator position is immediately supplied to the combustion chamber 14 before the valves 28 and 44 are fully open, then incomplete combustion of fuel takes place and the resultant black smoke is contained in the exhaust gas.

More specifically, provided the time lag of each of the exhaust brake valve 28 and the silencer valve 44 is 0.4 sec, for example, and the rotational speed of the engine 10 is 1200 rpm, when the current supply to the three-way valve 32 is stopped because of depression of the accelerator pedal 60, the engine 10 makes eight revolutions during the transition period until the valves 28 and 44 are completely opened. Since the engine 10 undergoes four combustion strokes during the transition period, the supply of intake air to the combustion chamber 14 during these combustion strokes becomes insufficient, with the result that incomplete combustion of fuel takes place and the resultant black smoke is contained in the exhaust gas.

Also in the case where the silencer valve 44 is not provided in the engine 10, the discharge of gas from the combustion chamber 14 becomes insufficient during the transition period, causing a deficient supply of intake air to the combustion chamber 14. Consequently, incomplete combustion of fuel takes place and the resultant black smoke is contained in the exhaust gas.

By contrast, where the amount of fuel supplied to the combustion chamber 14 is controlled in the above-described manner in the initial stage of the transition period, that is, during the period T1, or more specifically, where the amount of fuel per injection is gradually increased from zero from the start time $t_0$ for the period T1 with increase in the opening of the exhaust brake valve 28 and the silencer valve 44, incomplete combustion of fuel is prevented and the generation of black smoke in the exhaust gas can be reduced.

During the period T2 after a lapse of the period T1 from the start time $t_0$, the corrected accelerator signal is rapidly increased toward the actual accelerator signal; therefore, the amount of fuel supplied per injection to the combustion chamber 14 also increases and the fuel supply never becomes deficient. Accordingly, the output of the engine 10 instantly increases and a delay of vehicle acceleration relative to the depression of the accelerator pedal 60 never occurs, whereby good drivability of the vehicle is ensured.

Although the amount of fuel injected into the combustion chamber 14 is suddenly increased during the period T2, fuel has then already been injected into the combustion chamber 14 and the output of the engine 10 has also been increased. Accordingly, the vehicle can be accelerated smoothly and the vehicle body undergoes no shock at the time of acceleration.

According to the results of vehicle running tests, it was confirmed that where the period T1 was set to 0.12 sec and the aforementioned value $A_1$ was set to a value such that the amount of fuel injected into the combustion chamber 14 during the period T1 was restricted to 8% or less of the amount of fuel determined based on the actual accelerator signal to be supplied during the same period T1, both the generation of black smoke and the deterioration in the drivability of the vehicle, which are in a trade-off relationship, could be prevented.

Figure 3:
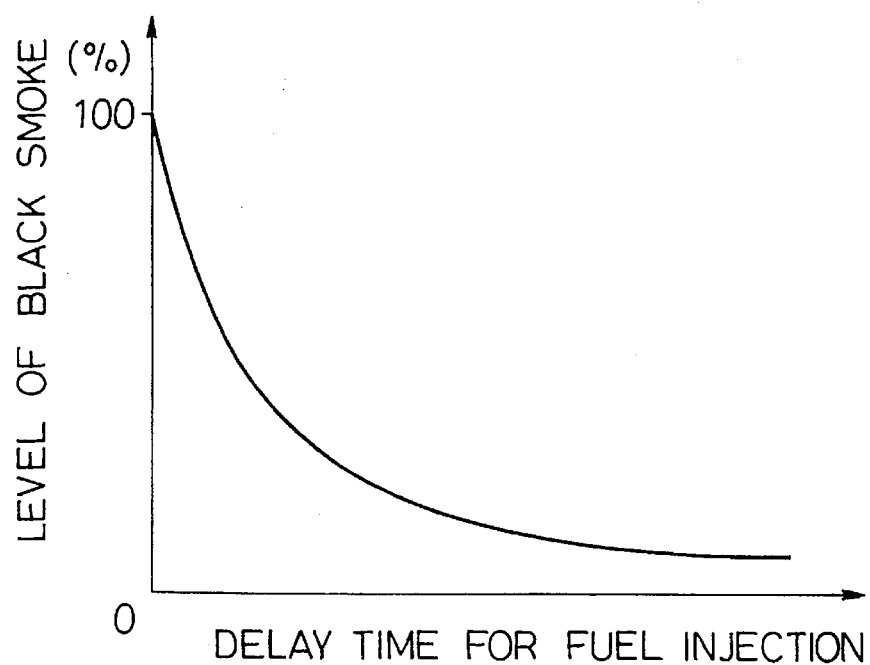
FIG. 3 is a graph illustrating the relationship between the delay time for fuel injection and the level of smoke.

Referring to FIG. 3, there is shown the relationship between the delay time for the fuel injection into the combustion chamber and the level of black smoke contained in the exhaust gas. As illustrated, the level of black smoke suddenly decreases as the delay time is increased from zero, but the degree of reduction becomes almost the same when the delay time is prolonged to a certain time period or longer. This demonstrates that the amount of generation of black smoke in the exhaust gas can be effectively reduced by gradually increasing the amount of fuel supply per injection from zero from the start time $t_0$ for the period T1 as described above.

What is claimed:

1. An exhaust brake system for a motor vehicle, comprising:

a valve inserted in an exhaust passage extending from an engine of the motor vehicle, said valve having an open position at which the exhaust passage is opened, and a closed position at which the exhaust passage is closed;

actuating means for actuating said valve so as to switch between the open position and the closed position;

switch means for operating said actuating means to cause said valve to switch from the open position toward the closed position;

releasing means for operating said actuating means to cause said valve to switch from the closed position toward the open position when an accelerator pedal of the motor vehicle is depressed while said valve is in the closed position; and control means for reducing an amount of fuel to be supplied to a combustion chamber of the engine to a value smaller than a required amount of fuel determined based on depression of the accelerator pedal, during a predetermined control period from a release time at which said actuating means is operated by said releasing means.

2. The exhaust brake system according to claim 1, wherein said control means includes a control pattern for determining a total amount of fuel to be injected during the control period, the control pattern having a first section which is started from the release time and in which the amount of fuel per injection is reduced to a value smaller than the required amount of fuel injection, a second section which is started upon lapse of the first section and in which the amount of fuel per injection is rapidly increased to a value close to the required amount of fuel injection, and a third section which is started upon lapse of the second section and in which the amount of fuel per injection is made to converge to the required amount of fuel injection.

3. The exhaust brake system according to claim 2, wherein a total amount of fuel supplied to the combustion chamber during the first section of the control pattern is restricted to 5% to 30% of an amount of fuel supply determined by the required amount of fuel injection and a period equivalent to the first section.

4. The exhaust brake system according to claim 3, wherein the amount of fuel per injection is gradually increased during the first section of the control pattern.

5. The exhaust brake system according to claim 4, wherein said valve comprises a butterfly valve, and said actuating means comprises a pneumatic actuator for actuating the butterfly valve, the first section of the control pattern having a period set to 0.07 to 0.18 sec.

6. The exhaust brake system according to claim 2, wherein said control means comprises a sensor for outputting an actual accelerator signal corresponding to depression of the accelerator pedal, and output means for receiving the actual accelerator signal from the sensor and outputting a control signal determining an amount of fuel injection into the combustion chamber in accordance with the actual accelerator signal, the output means including as the control pattern a correction pattern for correcting the actual accelerator signal.

7. The exhaust brake system according to claim 1, which further comprises a second valve inserted in an intake passage of the engine and having an open position at which the intake passage is opened and a closed position at which the intake passage is closed, and second actuating means for actuating the second valve so as to switch between the open position and the closed position, the second actuating means being operated in a manner interlocked with the first actuating means, and the second valve being opened or closed together with the first valve.

8. The exhaust brake system according to claim 7, wherein said control means includes a control pattern for determining a total amount of fuel to be injected during the control period, the control pattern having a first section which is started from the release time and in which the amount of fuel per injection is reduced to a value smaller than the required amount of fuel injection, a second section which is started upon lapse of the first section and in which the amount of fuel per injection is rapidly increased to a value close to the required amount of fuel injection, and a third section which is started upon lapse of the second section and in which the amount of fuel per injection is made to converge to the required amount of fuel injection.

9. The exhaust brake system according to claim 8, wherein a total amount of fuel supplied to the combustion chamber during the first section of the control pattern is restricted to 5% to 30% of an amount of fuel supply determined by the required amount of fuel injection and a period equivalent to the first section.

10. The exhaust brake system according to claim 9, wherein the amount of fuel per injection is gradually increased during the first section of the control pattern.

11. The exhaust brake system according to claim 10, wherein said valve comprises a butterfly valve, and said actuating means comprises a pneumatic actuator for actuating the butterfly valve, the first section of the control pattern having a period set to 0.07 to 0.18 sec.

12. The exhaust brake system according to claim 8, wherein said control means comprises a sensor for outputting an actual accelerator signal corresponding to depression of the accelerator pedal, and output means for receiving the actual accelerator signal from the sensor and outputting a control signal determining an amount of fuel injection into the combustion chamber in accordance with the actual accelerator signal, the output means including as the control pattern a correction pattern for correcting the actual accelerator signal.

* * * * *